(12) United States Patent
Siefermann et al.

(10) Patent No.: US 7,232,117 B2
(45) Date of Patent: Jun. 19, 2007

(54) PNEUMATIC SPRING POT AND METHOD FOR PRODUCING SAME

(75) Inventors: Horst Siefermann, Achern-Wagshurst (DE); Uwe Nestlen, Offenburg (DE)

(73) Assignee: Progress Werk Oberkirch AG, Oberkirch (DE)

( * ) Notice: Subject to any disclaimer, the term of this patent is extended or adjusted under 35 U.S.C. 154(b) by 350 days.

(21) Appl. No.: 10/760,321

(22) Filed: Jan. 16, 2004

(65) Prior Publication Data

US 2004/0188898 A1 Sep. 30, 2004

Related U.S. Application Data

(63) Continuation of application No. PCT/EP02/07206, filed on Jun. 29, 2002.

(30) Foreign Application Priority Data

Jul. 18, 2001 (DE) .................. 101 35 063

(51) Int. Cl.
*F16F 5/00* (2006.01)
*B21F 35/00* (2006.01)
(52) U.S. Cl. .................. 267/64.11; 29/896.9; 72/379.2
(58) Field of Classification Search ............. 267/64.11, 267/64.21, 64.23, 64.24, 64.27, 220, 122; 29/896.9, 896.91, 896.93; 280/124, 147, 280/155; 72/379.2, 379.4, 356
See application file for complete search history.

(56) References Cited

U.S. PATENT DOCUMENTS

| 2,874,458 | A | * | 2/1959 | Smith | ............. 29/436 |
|---|---|---|---|---|---|
| 5,060,916 | A | * | 10/1991 | Koschinat et al. | ........ 267/64.27 |
| 6,260,402 | B1 | * | 7/2001 | Leek | ........................ 72/379.2 |
| 6,412,758 | B1 | * | 7/2002 | Wenzel et al. | ............ 267/64.21 |
| 2004/0222577 | A1 | * | 11/2004 | Moritz et al. | ............. 267/64.27 |

FOREIGN PATENT DOCUMENTS

| DE | 87 08 507.0 | 9/1987 |
|---|---|---|
| DE | 89 03 264.0 | 7/1989 |
| DE | 196 16 476 A1 | 11/1997 |
| DE | 298 08 109 U1 | 8/1998 |
| DE | 199 52 919 A1 | 6/2000 |
| DE | 199 07 656 A1 | 8/2000 |
| DE | 100 50 028 A1 | 5/2001 |
| GB | 818604 | 8/1959 |

OTHER PUBLICATIONS

Prof. Dipl.-Ing. Jörnsen Reimpell, Dipl.-Ing. Helmut Stoll; Fahrwerktechnik: Stoβ-und Schwingungs-dämper; 2nd Edition, Vogel-Buchverlag, Würzburg 1989; pp. 228-230.

* cited by examiner

*Primary Examiner*—Pam Rodriguez
(74) *Attorney, Agent, or Firm*—Harness, Dickey & Pierce, P.L.C.

(57) ABSTRACT

A pneumatic spring pot has a pot wall and a bottom connected to the pot wall and also an annular flange connected, opposite the bottom, to the pot wall and intended for the fastening of, for example, a pneumatic spring concertina, the annular flange having a smaller diameter than the largest diameter of the pot wall. The bottom, pot wall and annular flange are formed in one piece with one another by sheet metal forming from a sheet part, in such a way that the annular flange is formed from the outer edge region of the sheet bar. Furthermore, a method for producing the pneumatic spring pot is described.

11 Claims, 2 Drawing Sheets

PNEUMATIC SPRING POT AND METHOD FOR PRODUCING SAME

CROSS-REFERENCE TO RELATED APPLICATIONS

The present application is a continuation of pending international patent application PCT/EP 02/07206 filed on Jun. 29, 2002 which designates the United States, which was published in German, and which claims priority of German patent application 101 35 063.5 filed on Jul. 18, 2001.

BACKGROUND OF THE INVENTION

The invention relates to a pneumatic spring pot, comprising a pot wall, a bottom connected to the pot wall and a first annular flange opposite the bottom and connected to the pot wall.

The invention relates, furthermore, to a method for producing a pneumatic spring pot of the abovementioned type.

Such a pneumatic spring pot is part of a pneumatic spring system which is used in motor vehicles for the spring suspension of the superstructures or body.

The pneumatic spring pot, as a structural part of a pneumatic spring system, has the function of providing an air volume. A further function of the pneumatic spring pot is, at one end, to ensure the tie-off of, for example, a pneumatic spring concertina or other pneumatic spring components, for which purpose the pot wall is connected correspondingly to an annular flange narrow in diameter. A bottom is connected to the pot wall at that end of the latter which is opposite the annular flange, in order to tie the pneumatic spring pot up to the body, for example by means of threaded bolts. A further function of the bottom is, for example, to receive the damper bearing and, as a result of this, to absorb damper forces. In the installed state of the pneumatic spring pot, the bottom forms the upper end of the pneumatic spring pot and the annular flange for the fastening of, for example, the pneumatic spring concertina forms the lower end of the pneumatic spring pot.

The pneumatic spring pot known from DE 199 07 656 A1 has a first supporting part and a second supporting part, between which the pneumatic spring concertina is fastened. The two supporting parts each have a bottom, a pot wall and an annular flange, these abovementioned parts as a whole being formed in one piece with one another from sheet metal. The production method for the two pots serving as supporting parts is not described in the document. Furthermore, the bottom is not suitable, either in the first supporting part or in the second supporting part, for serving as receptacle for a damper bearing.

A further pneumatic spring pot is known from the German book "Fahrwerktechnik: Stoβ- und Schwingungsdämpfer" ["Chassis Technology: Impact and Vibration Dampers"], $2^{nd}$ Edition, Vogel-Buchverlag, Würzburg 1989. This pneumatic spring pot has a bottom, a pot wall and an annular flange for fastening a pneumatic spring concertina, the bottom, pot wall and annular flange again being formed in one piece from sheet metal.

The bottom of this pneumatic spring pot has an orifice, through which a piston rod is led, the damper bearing or head bearing being arranged as a separate structural part of the bottom. There is therefore no integration of the head bearing housing or damper bearing housing into the pneumatic spring pot, this leading to a generally complicated overall form of construction of the pneumatic spring system.

Pneumatic spring pots constructed at least from two parts are also known. A first part in this case consists of the bottom and of a portion of the pot wall, and the at least second part consists of the remaining portion of the pot wall and the abovementioned annular portion. These two parts are connected to one another by means of an assembly method, conventionally by means of welding. A pneumatic spring pot of this type is known, for example, from DE 100 50 028 A1.

In the two-part design of the pneumatic spring pot, the two individual parts are manufactured, as a rule, as drawn parts which are subsequently assembled by welding. The disadvantage of the at least two-part design of the pneumatic spring pot is, however, that the number of operations required and therefore the outlay in terms of time and cost in the production of the pneumatic spring pot are increased.

However, because of the narrowing in diameter of the annular flange at the concertina start, it is not possible for a generally one-part design of the pneumatic spring pot with bottom, pot wall and annular flange to be implemented to the desired extent of the narrowing in diameter in one and the same sheet metal forming methods, for example in a deep-drawing method.

This is also, inter alia, because, normally, a further annular flange for the damper bearing is already integrally formed onto the bottom of the pneumatic spring pot and projects away from the bottom in the same direction as the annular flange at the opposite end.

The known multipart design of the pneumatic spring pot with the at least two pneumatic spring pot parts being welded together has the further disadvantage that the manufactured pneumatic spring pot subsequently also has to be sealed by being surface-treated, for example with a lacquer. For even when the pneumatic spring pot is produced from an initial material which has received surface treatment, for example galvanization, this surface treatment is destroyed at the weld seam due to the welding. In order to avoid corrosion of the finished pneumatic spring pot, therefore, the pneumatic spring pot has to be sealed once again, at least in the region of the weld seam.

In the known pneumatic spring pots constructed from two deep-drawn parts welded to one another, a supporting ring was additionally also required in order to tie the pneumatic spring concertina to the annular flange, so that the annular flange does not collapse owing to the high pressure force of the pneumatic spring concertina. To be precise, the pneumatic spring concertina is fastened to the annular flange with a high pressure force, in order to avoid an undesirable detachment from the pneumatic spring pot during the operation of the pneumatic spring system.

It will be conceivable, in principle, to manufacture a pneumatic spring pot of the type initially mentioned in one piece from the solid material by lathe-turning. Since manufacture of the pneumatic spring pot by turning from a solid material entails a very cost-intensive high outlay in terms of material and time, the method of this type is not suitable for large series manufacture.

SUMMARY OF THE INVENTION

The object on which the invention is based is, therefore, to provide a pneumatic spring pot of the type initially mentioned and a method for producing it, which is suitable for large series manufacture, and in which, in particular, the outlay in terms of material and cost is kept low, while at the same time the pneumatic spring pot has a high degree of functionality, and, in addition to the function of the fastening of the pneumatic concertina, the one-piece pneumatic spring pot is also to fulfil the function of receiving the damper bearing.

According to the one aspect of the invention, a pneumatic spring pot is provided comprising a pot wall having a first diameter, a bottom connected to said pot wall, a first annular flange opposite said bottom and connected to said wall, said first annular flange having a second diameter smaller than said first diameter of said pot wall, wherein said bottom, said pot wall and said first annular flange are formed in one piece with one another from a sheet metal by sheet metal forming from a sheet bar, in such a way that said annular flange is formed from an outer edge region of said sheet bar, and a second annular flange connected to said bottom and produced in one piece with said bottom.

Further, according to another aspect of the invention, a method for producing a pneumatic spring pot is provided, said pneumatic spring pot having a pot wall, a bottom connected to said pot wall and a first annular flange opposite said bottom and connected to said pot wall, said pot wall having a first diameter and said first annular flange having a second diameter smaller than that first diameter of said pot wall, said method comprising the steps of forming said bottom, said pot wall and said first annular flange in one piece with one another from sheet metal by sheet metal forming from a sheet bar, wherein said sheet metal forming is carried out in such a way that, starting from said sheet bar, said first annular flange is formed from an outer region of said sheet bar, and wherein a second annular flange is integrally formed on said bottom.

The pneumatic spring pot according to the invention and the method for producing it depart from the known concept of forming the pneumatic spring pot from at least two parts, for example two deep-drawn parts, which are subsequently then assembled, for example, by welding. Instead, the pneumatic spring pot according to the invention is produced overall in one piece, that is to say the bottom, pot wall and first annular flange are produced in one part or in one piece. The pneumatic spring pot according to the invention is formed from a sheet bar, that is to say a plate blank made of metal, by sheet metal forming, and, according to the invention, there is provision for the first annular flange of the finished pneumatic spring pot to be formed out of the outer region of the original sheet bar. This type of sheet metal forming of the sheet bar to form the pneumatic spring pot brings about a material consolidation in the outer edge region of the sheet bar and consequently, in the finished pneumatic spring pot, in the region of the first annular flange that serves for the fastening of, for example, the pneumatic spring concertina. This material consolidation is a consequence of the fact that the outer edge region of the sheet bar is subjected to the most forming operations up to the finished forming of the first annular flange. In the known pneumatic spring pots assembled from two deep-drawn parts, the procedure was reversed, that is to say a pot part having an annular flange was formed in such a way that the annular flange was formed out of the middle region of the sheet path and therefore, at most, insignificant material consolidation occurs in the region of the annular flange.

The material consolidation in the region of the annular flange, brought about in the pneumatic spring pot according to the invention, has, then, the considerable advantage that the supporting ring, which was necessary in the pneumatic spring pots for fastening the pneumatic spring concertina, can now be dispensed with in the pneumatic spring pot according to the invention, with the result that the cost outlay of the pneumatic spring pot is reduced even further.

The pneumatic spring pot according to the invention has the further advantage that, because the pneumatic spring pot is manufactured in one piece by sheet metal forming from a single sheet bar, the number of operations is now reduced, in particular that the operation of assembly, for example welding or crimping, and of leak testing becomes superfluous. Since the welding operation is dispensed with, however, the pneumatic pot according to the invention achieves the further advantage that the pneumatic spring pot can be formed from a surface-treated sheet bar, and the finished pneumatic spring pot subsequently no longer requires any further surface treatment for corrosion protection, since the surface treatment or surface tempering is not damaged by the sheet metal forming, as is the case when the pneumatic spring pot is welded from two parts in the region of the weld seam. The pneumatic spring pot according to the invention and the method according to the invention are distinguished by a low outlay in terms of material, at the same time with an increased functionality of the pneumatic spring pot with regard to its stability, since the abovementioned material consolidation occurs without the use of additional material, and by the correspondingly reduced outlay in terms of cost and also time, so that the pneumatic spring pot according to the invention and the method according to the invention are especially suitable for large series manufacture.

Since, in the pneumatic spring pot according to the invention, the bottom is therefore formed with a second annular flange, the advantage of this is that, despite the pneumatic spring pot being designed overall in one piece, a further function is integrated into this, to be precise the second annular flange serves, for example, for receiving the damper bearing. Instead of the pneumatic spring pot being assembled from two parts, each with one function, as in the prior art, the pneumatic spring pot according to the invention thus consists as a whole of only one part with two functions integrated in it, to be precise on the one hand, for example, the fastening of the pneumatic spring concertina or the fastening of further pneumatic spring components and, on the other hand, for example, the reception of the damper bearing or the tie-up of the pneumatic spring pot to the body. The further advantage of the abovementioned measure is that the second annular flange can be integrally formed onto the bottom in the same sheet metal forming method, for example the deep-drawing method for drawing the prepot, in which the bottom and the pot wall are formed from the sheet bar, as a result of which, despite the integral forming of a further functional element, the number of operations is not increased or, at least, the outlay in terms of time for producing these functional elements is not appreciably increased.

In a preferred embodiment of the pneumatic spring pot, the bottom and the pot wall are formed from the sheet bar by deep drawing.

In the method according to the invention, correspondingly, the pot wall is first deep-drawn from the sheet bar, a middle region of the sheet bar forming the bottom.

Deep drawing as sheet metal forming has the advantage that a deep-drawing method is especially suitable for large series manufacture. The further advantage of deep drawing is that the effect of material consolidation in the way mentioned above is particularly pronounced in the case of this sheet metal forming method. The bottom and the pot wall can thus be drawn in a particularly cost-effective and time-saving way into a prepot, on which the annular flange is then formed later.

In a further preferred embodiment, the first annular flange is formed by welding, pressing or indrawing.

In the method according to the invention, correspondingly, that edge region of the pot wall which is opposite the bottom and which corresponds to the outer edge region of the original sheet bar is narrowed in diameter by rolling, pressing or indrawing, in order to form the first annular flange.

In particular, the forming of the first annular flange by rolling is especially preferred and advantageous, because, owing to the rolling, a further material consolidation occurs in the region of the annular flange. Particularly in conjunction with the abovementioned measure, according to which the bottom and the pot wall are first drawn from the sheet path into a prepot, a material consolidation in the region of the first annular flange up to a factor of 1.4 in relation to the material strength of the original sheet bar can be achieved by means of the subsequent rolling of the outer edge region of this prepot. The rolling of the first annular flange has the further advantage that, by means of the rolling, a very pronounced narrowing in diameter, if necessary, of the first annular flange with respect to the largest diameter of the pot wall can be attained, and this cannot be achieved by means of a deep-drawing operation or indrawing.

In a further preferred embodiment of the pneumatic spring pot, the ratio of the diameter of the first annular flange and the largest diameter of the pot wall is smaller than about 0.8.

In the case of such a narrowing in diameter of the annular flange in relation to the largest diameter of the pot wall, a particularly pronounced material consolidation is attained in the region of the first annular flange by means of an appropriate sheet metal forming, such as, for example, rolling, with the result that a very high rigidity of the first annular flange and consequently a very high stability of the first annular flange are achieved, so that the pneumatic spring concertina can be fastened to the first annular flange with high pressure force.

In a further preferred embodiment of the pneumatic spring pot, the sheet bar is surface-treated, for example galvanized.

As already mentioned above, the design according to the invention of the pneumatic spring pot and the method according to the invention for producing it affords the possibility of already using a surface-treated material, for example galvanized sheet metal, as initial material, since the manufacture of the pneumatic spring pot does not require any operations, such as welding or the like, which may damage the surface treatment, for example the galvanization, in the region of the weld seam. Since, then, the pneumatic spring pot is formed from a surface-treated, for example galvanized sheet bar, this affords the advantage that the finished pneumatic spring pot does not have to be subjected to any further treatment after the end of sheet metal forming, in particular does not have to be sealed or lacquered. The outlay in terms of cost and the outlay in terms of time in the manufacture of the pneumatic spring pot are thus reduced even further.

In a further preferred embodiment of the method, correspondingly, starting from an orifice in the middle region of the sheet bar, the second annular flange (damper bearing receptacle) is integrally formed on the bottom, together with the forming of the pot wall, by means of the same sheet metal forming method.

Further advantages may be gathered from the following description and the accompanying drawing.

It goes without say that the features mentioned above and those yet to be explained below can be used not only in the combination specified in each case, but also in other combinations or alone, without departing from the scope of the present invention.

BRIEF DESCRIPTION OF THE DRAWINGS

An outlined example of the invention is illustrated in the drawing and is described in more detail hereafter with reference to the latter. In the drawing.

DETAILED DESCRIPTION OF A PREFERRED EMBODIMENT

Figure 1:
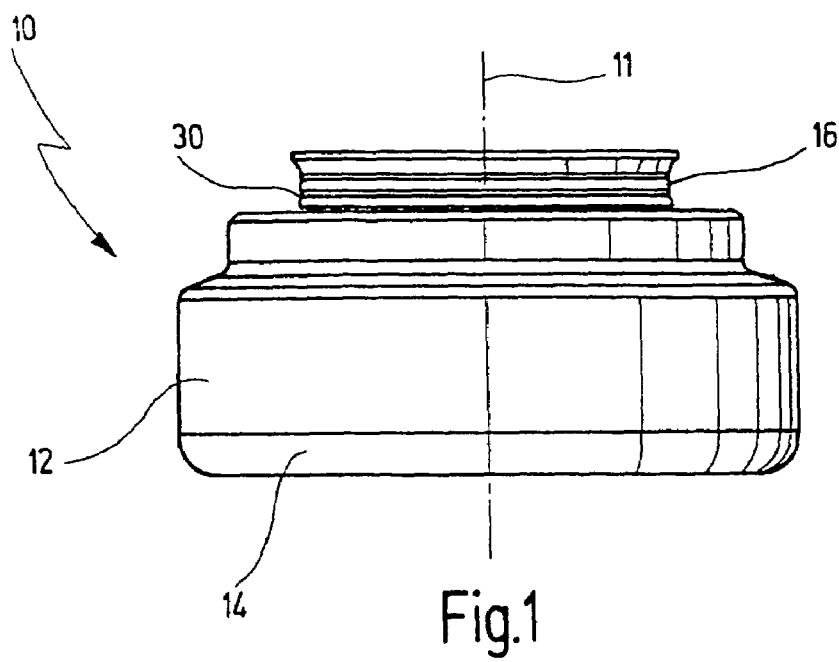
FIG. 1 shows a side view of a pneumatic spring pot.
Figure 4:
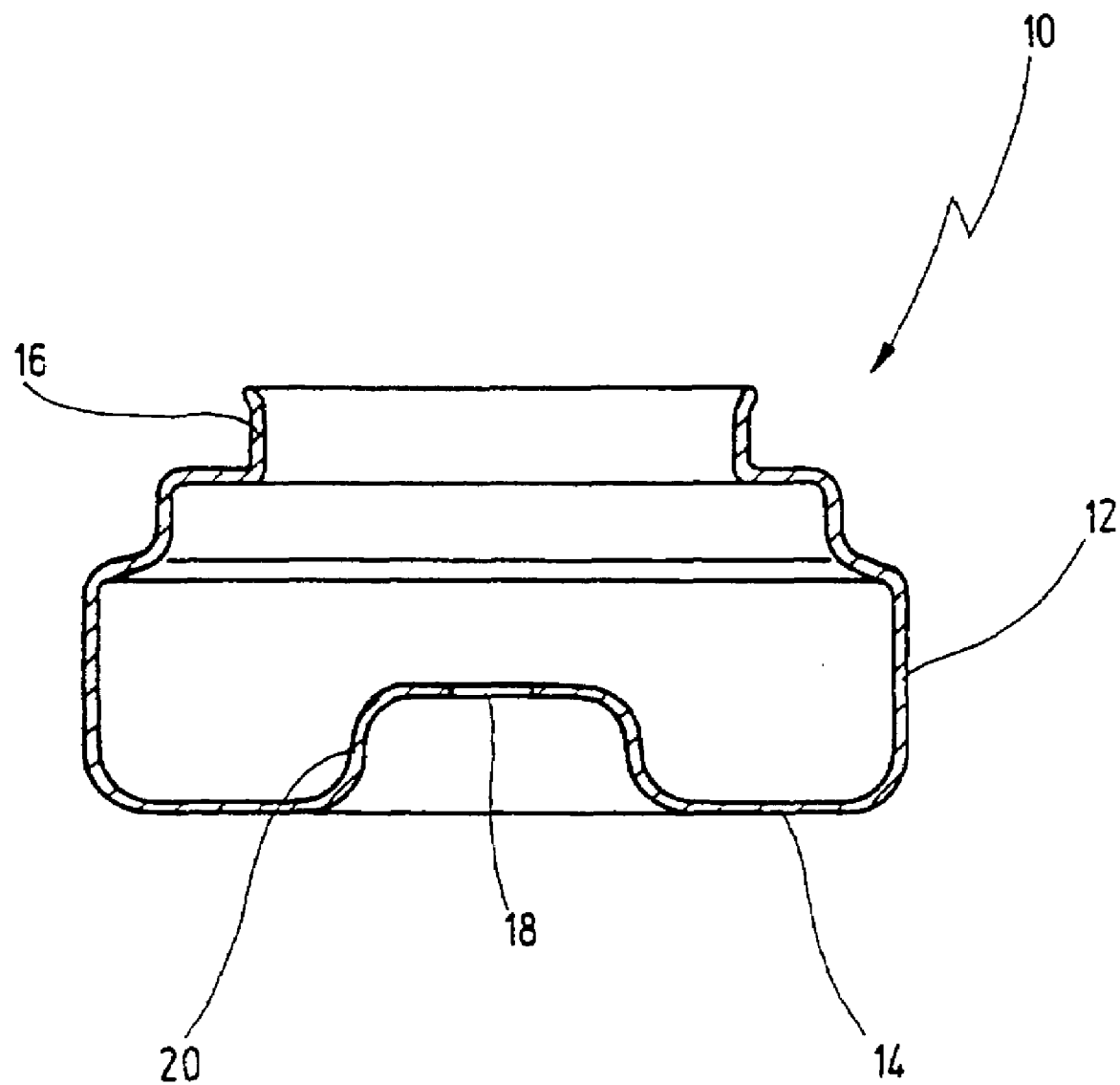
FIG. 4 shows the pneumatic spring pot in FIG. 1 after further forming of the prepot in FIG. 3 to the finished pneumatic spring pot.

FIGS. 1 and 4 illustrate a pneumatic spring pot given the general reference symbol 10. The pneumatic spring pot 10 is used in a pneumatic spring system, for example, for motor vehicle spring suspension. The pneumatic spring pot 10 is designed, overall, rotationally symmetrical with respect to its longitudinal center axis 11. The pneumatic spring pot 10 may, however, also have a design which is not rotationally symmetrical.

The pneumatic spring pot 10 has a pot wall 12. The pot wall 12 is connected to a bottom 14 and, furthermore, is connected, opposite the bottom 14, to a first annular flange 16 which serves for the fastening of, for example, a pneumatic spring concertina, not illustrated in the drawing. In an embodiment which is not rotationally symmetrical, the annular flange 16 may also be arranged eccentrically to the pot wall 12.

In the exemplary embodiment shown, the bottom 14 has an orifice 18 receiving a damper bearing or head bearing, not illustrated, the orifice 18 being formed on a second annular flange 20 connected to the bottom 14. The second annular flange 20 in this case points in the same direction as the first annular flange 16 or projects from the bottom 14 in the direction of the first annular flange 16. The second annular flange 20 may, however, also project from the bottom 14 in the opposite direction, that is to say outward with respect to the pneumatic spring pot 10.

The annular flange 16, which serves for the tie-up of, for example, a pneumatic spring concertina, has a smaller diameter than the largest diameter of the pot wall 12, as may be gathered from FIGS. 1 and 4. The ratio of the diameter of the annular flange 16 and the largest diameter of the pot wall 12 is in this case smaller than about 0.8.

Figure 2:
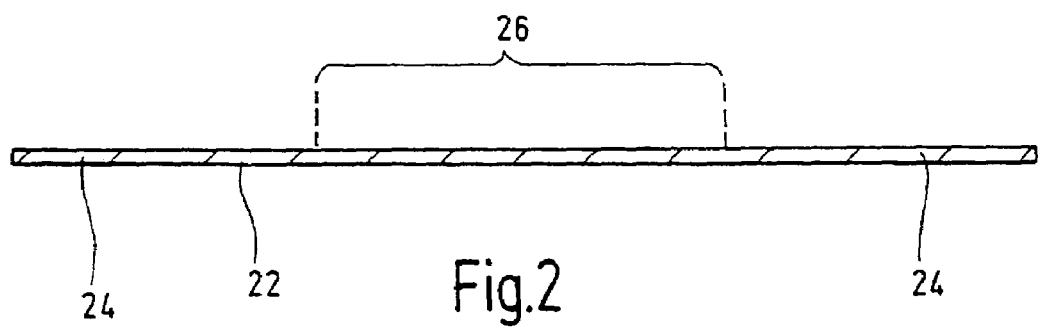
FIG. 2 shows, in cross section, a sheet bar from which the pneumatic spring pot in FIG. 1 is formed.

In the case of the pneumatic spring pot 10, the bottom 14, pot wall 12 and annular flange 16 are formed in one piece with one another by sheet metal forming from a sheet bar 22 which is illustrated in FIG. 2. The sheet bar 22 in FIG. 2 is illustrated as not being true to scale in relation to the pneumatic spring pot 10.

The sheet metal forming was carried out in such a way that the annular flange 16 is formed from the outer edge region 24 of the sheet bar 22. The bottom 14 of the pneumatic spring pot 10 is formed correspondingly from the sheet bar 22 by means of a middle region 26.

The further annular flange 20, too, is connected in one piece to the bottom 14.

While the bottom 14 and the top wall 12 and also the further annular flange 20 are formed from the sheet bar 22 by deep drawing, the annular flange 16 is formed by rolling, as is described in more detail later.

The sheet bar 22 from which the pneumatic spring pot 10 is formed has been surface-treated before forming and is, for example, a galvanized steel sheet.

A method for producing the pneumatic spring pot 10, then, is described below with reference to FIG. 2 to 4.

The sheet bar 22 in FIG. 2 is a circular plate blank consisting of galvanized sheet steel.

Figure 3:
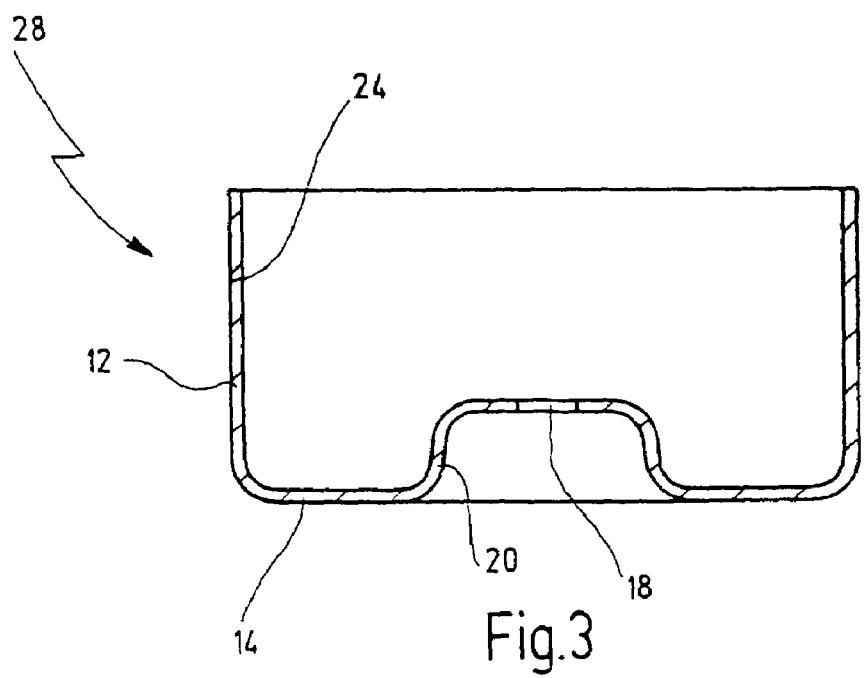
FIG. 3 shows a prepot which has been formed from the sheet bar in FIG. 2 as a precursor of the finished pneumatic spring pot in FIG. 1.

According to FIG. 3, a prepot 28 is first drawn out of the sheet bar 22, the prepot 28 already having the finished bottom 14 with the further annular flange 20 and with the orifice 18. Furthermore, the prepot 28 already has the pot wall 12. The outer edge region 24 of the sheet bar 22 is located, in the case of the prepot 28, at the free open edge of the latter, said edge being located opposite the bottom 14.

After the deep drawing of the prepot 28, the outer edge region 24 is rolled by means of rolling tools, not illustrated, in order to form the annular flange 16 integrally onto the pot wall 12, as illustrated in FIG. 4 in the case of the finished pneumatic spring pot 10. In the exemplary embodiment shown, the rolling of the outer edge region 24 for forming the annular flange 16 is carried out in two steps, in order to achieve the desired pronounced narrowing in diameter of the outer flange 16 with respect to the largest diameter of the pot wall 12.

The deep drawing of the prepot 28 gives rise, in the outer edge region 24, to a material consolidation which is further reinforced by the rolling of the outer edge region 24 for forming the annular flange 16, in particular by the two-step rolling of the outer edge region 24 in the case of the pronounced narrowing in diameter, illustrated here, for the annular flange 16 with respect to the largest diameter of the pot wall 12.

In the exemplary embodiment shown, the ratio of the diameter of the flange 16 and the largest diameter of the pot wall 12 is about 0.6.

During the rolling of the annular flange 16, grooves 30 can be integrally formed on the outside in the latter, as illustrated in FIG. 1, said grooves serving for an improved hold of the pneumatic spring concertina to be tied to the annular flange 16.

Moreover, it is possible for the further annular flange 20 with the orifice 18 to be formed further, for example for the orifice 18 to be widened and for the annular flange 20 likewise to be widened radially outward.

What is claimed is:

1. A pneumatic spring pot, comprising:
   a pot wall having a first diameter;
   a bottom connected to said pot wall;
   a first annular flange opposite said bottom and connected to said wall, said first annular flange having a second diameter smaller than said first diameter of said pot wall,
   wherein said bottom, said pot wall and said first annular flange are formed in one piece with one another from a sheet metal by sheet metal forming from a sheet bar, in such a way that said annular flange is formed from an outer edge region of said sheet bar, and
   a second annular flange connected to said bottom and defining an opening in said bottom, said second annular flange being produced in one piece with said bottom.

2. The pneumatic spring pot of claim 1, wherein said bottom and said pot wall are formed from said sheet bar by deep drawing.

3. The pneumatic spring pot of claim 1, wherein said first annular flange is formed by a process chosen from a group comprising rolling, pressing and indrawing.

4. The pneumatic spring pot of claim 1, wherein a ratio of said second diameter of said first annular flange and said first diameter of said pot wall is smaller than about 0.8.

5. The pneumatic spring pot of claim 1, wherein said sheet bar is surface-treated.

6. The pneumatic spring pot of claim 1, wherein said second annular flange is adapted for receiving a damper bearing of a vehicle suspension.

7. A method for producing a pneumatic spring pot, said pneumatic spring pot having a pot wall, a bottom connected to said pot wall and a first annular flange opposite said bottom and connected to said pot wall, said pot wall having a first diameter and said first annular flange having a second diameter smaller than said first diameter of said pot wall, said method comprising the steps of:
   forming said bottom, said pot wall and said first annular flange in one piece with one another from sheet metal by sheet metal forming from a sheet bar, wherein said sheet metal forming is carried out in such a way that, starting from said sheet bar, said first annular flange is formed from an outer region of said sheet bar, and wherein a second annular flange is integrally formed on said bottom defining an opening in said bottom.

8. The method of claim 7, wherein said pot wall is first deep-drawn from said sheet bar, and said bottom is formed from a middle region of said sheet bar.

9. The method of claim 8, wherein an edge region of said pot wall which is opposite said bottom and which corresponds to said outer edge region of said sheet bar is narrowed in diameter by a process chosen from the group comprising rolling, pressing and indrawing, in order to form said first annular flange.

10. The method of claim 7, wherein, starting from an orifice in a middle region of said sheet bar, said second annular flange is integrally formed on said bottom, together with forming of said pot wall, by means of the same sheet metal forming process used to form the bottom and pot wall.

11. The method of claim 7, wherein said second annular flange is adapted for receiving a damper bearing of a vehicle suspension.

* * * * *